United States Patent [19]
Ritter, Jr.

[11] 4,090,545
[45] May 23, 1978

[54] NUT LOCKING MEANS

[75] Inventor: Arthur J. Ritter, Jr., Metamora, Ill.

[73] Assignee: Caterpillar Tractor Co., Peoria, Ill.

[21] Appl. No.: 778,202

[22] Filed: Mar. 16, 1977

[51] Int. Cl.² ............................................. F16B 39/04
[52] U.S. Cl. .......................................... 151/28; 151/5
[58] Field of Search ................. 151/5, 28, 27, 24, 2 R, 151/29

[56] References Cited

U.S. PATENT DOCUMENTS

| | | | |
|---|---|---|---|
| 1,420,737 | 6/1922 | Palmgren | 151/28 |
| 1,431,459 | 10/1922 | Hardie | 151/28 |
| 3,285,312 | 11/1966 | Dison et al. | 151/5 X |

FOREIGN PATENT DOCUMENTS

| | | | |
|---|---|---|---|
| 24,313 of | 1909 | United Kingdom | 151/5 |

*Primary Examiner*—Ramon S. Britts
*Attorney, Agent, or Firm*—Wegner, Stellman, McCord, Wiles & Wood

[57] ABSTRACT

A locking arrangement is provided for retaining a nut, such as a spanner nut, locked in position on a shaft. The nut has a plurality of equally spaced apart apertures in one axial face thereof. An arcuate key is provided with a pair of apertures spaced apart the same distance as the apertures in the nut. The key has a projecting tang lying in the plane of the key and extending radially toward the center of said arcuate key. The radial centerline of the tang is offset from the centerline lying midway between the apertures in the key. With the apertures in the key aligned with two apertures in the nut, and with the tang positioned in a slot in the end of the shaft, bolts are passed through and tightened in the aligned apertures whereby the nut is locked in position with respect to the shaft.

9 Claims, 4 Drawing Figures

NUT LOCKING MEANS

BACKGROUND OF THE INVENTION

Frequently, it is necessary to position a nut, such as a spanner nut, on the end of a shaft so as to secure elements on the shaft in a relatively fixed position and with a predetermined force. A typical example would be in positioning a final drive bearing against a shoulder on a shaft with a predetermined force applied by the nut against the bearing mount. Heretofore, in some instances, a cap was provided for covering the shaft end and the nut, with the cap having an inwardly directed sleeve containing a plurality of radially facing flats. One or more of the flats on the cap engage with one or more of the flats on the nut so that, with the cap bolted to the housing around the bearing and the shaft, the flats on the cap will prevent the nut from moving relative to the shaft.

Most current locking arrangements for securing a nut relative to a shaft require the use of either a cap member or a plate which is bolted to a third member located near the nut and shaft. There are many situations requiring a locked nut on a shaft that do not have parts located near or convenient to the nut and shaft to which a cap or locking member can conveniently be secured.

SUMMARY OF THE INVENTION

The present invention is directed to overcoming one or more of the problems as set forth above.

According to the present invention, a key is bolted to the nut member and has a tang extending inwardly into engagement with one of a plurality of slots cut into the end portion of the shaft. When the number of apertures in the end face of the nut exceeds the number of slots in the shaft end portion, the centerline of the tang is angularly disposed to the centerline of the key so that the apertures in the key are aligned with adjacent apertures in the nut until the tang aligns up best with one of the slots in the shaft. At that point the key is bolted to the nut with the tang in the aligned slot to lock the nut to the shaft.

BRIEF DESCRIPTION OF THE DRAWINGS

The details of construction and operation of the invention are more fully described with reference to the accompanying drawings which form a part hereof and in which like reference numerals refer to like parts throughout.

In the drawings.

DESCRIPTION OF THE PREFERRED EMBODIMENT

Figure 1:
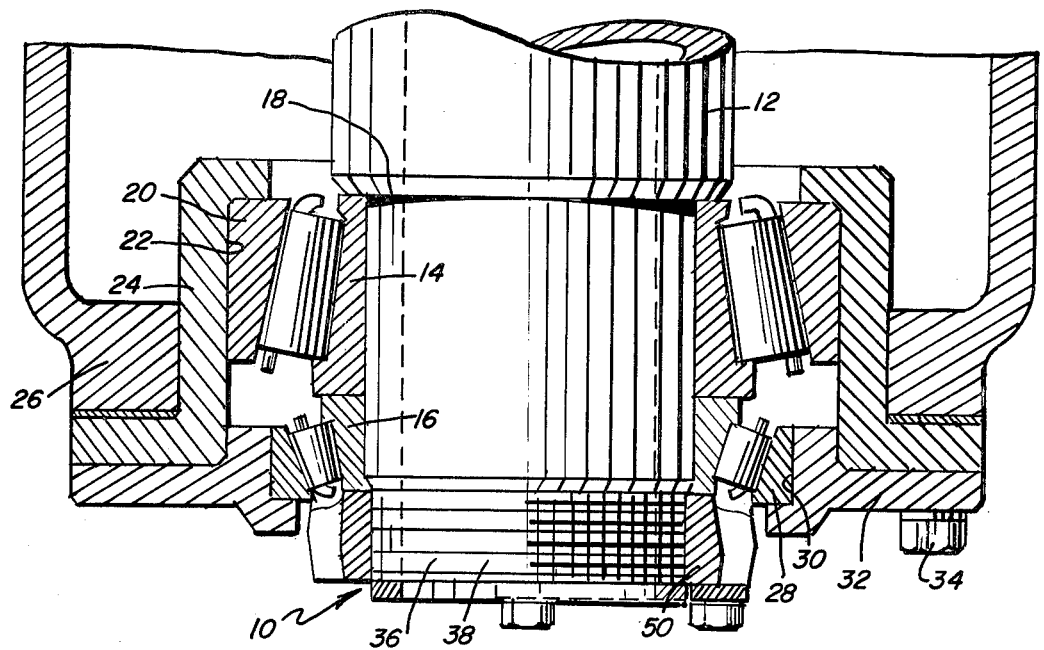
FIG. 1 is a cross-sectional view taken through a final drive bearing mount and along the lines 1—1 of FIG. 2 showing the invention.
Figure 2:
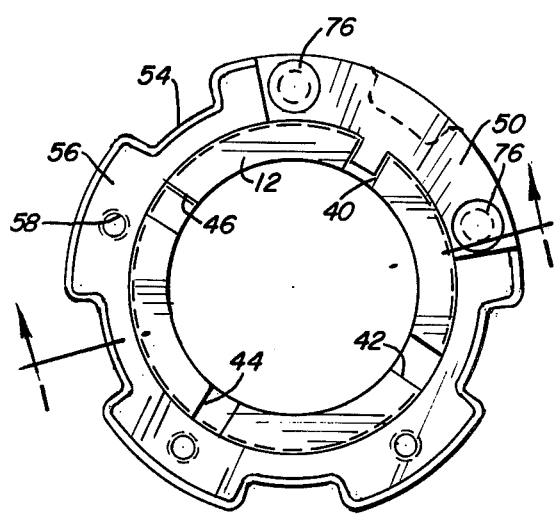
FIG. 2 is an end view of the nut and shaft end of FIG. 1.

Referring to the drawings wherein like reference numerals refer to like parts throughout, a locking arrangement 10 is shown in use on a shaft 12 for locking a pair of tapered bearings 14 and 16 against a shoulder 18 on the shaft 12. The bearing 14 has its outer raceway 20 nested in a recess 22 of a sleeve 24 carried by a housing 26. Likewise, bearing 16 has its outer raceway 28 seated in a recess 30 in a plate 32 bolted to the housing 26 by bolts 34.

The shaft 12 is threaded at 36 at the outer end portion 38 and has a plurality of radially disposed, equally spaced apart slots 40, 42, 44 and 46 formed in the sides thereof. In the illustrated form, the slots 40, 42, 44 and 46 are formed inwardly from the end face of the shaft 12, although it is to be understood that the slots 40, 42, 44 and 46 could be formed radially in from the sides of the shaft 12, with or without communication with the axial end face of the shaft 12. As illustrated, four slots are formed in the shaft 12 and they are spaced 90° apart. However, it is to be understood that more or less slots could be formed in the shaft 12 as desired.

A nut 50, having internal threads 52, is provided for threading onto the threads 36 on the end portion 38 of the shaft 12. As illustrated, the nut 50 is a spanner nut and has equally spaced apart gripping recesses 54 formed around the outer peripheral surface thereof. As shown, five recesses 54 are formed in the spanner nut. Once again, it is understood that more or less recesses could be formed around the periphery of the nut as desired. Between each pair of recesses 54 in the nut 50 is formed a radially outwardly extending lug 56 with a threaded aperture 58 extending axially into said lug 56. The axes of the apertures 58 lie parallel to the axis of the threaded portion 52 of the nut 50. Each lug 56 has an aperture 58 therein such that the apertures 58 are equally spaced apart around the nut 50 and all of the apertures 58 fall on a common circle with a center at the center of the nut 50.

Figure 3:
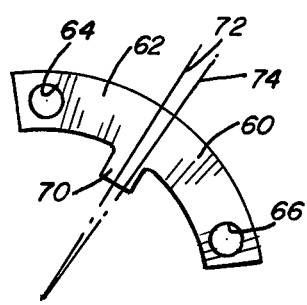
FIG. 3 is a plan view of the locking key.
Figure 4:
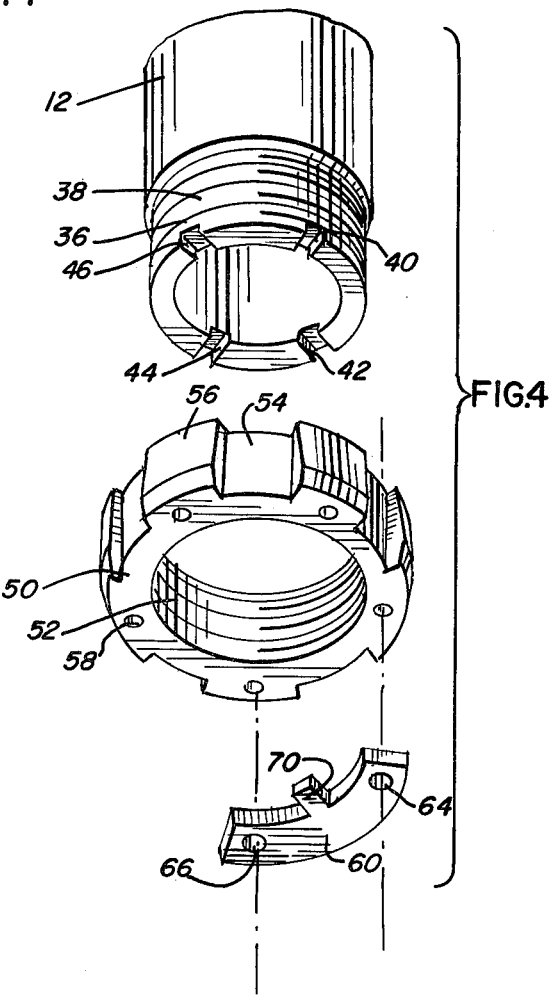
FIG. 4 is an exploded perspective view of a shaft, nut and locking key.

A locking key 60, which is best illustrated in FIG. 3, has an arcuately shaped body portion 62 with a pair of apertures 64, 66 extending therethrough with the axis of each aperture lying perpendicular to the plane of the body 62 of said key. The arcuate curve of the key 60 has a radius of curvature lying on the center of a circle such that an arc subscribed from said center will pass through the centers of the two apertures 64, 66 formed in the outer end portions of said key 60. The radial centerlines of the apertures 64, 66 subscribe an included angle at the center of the circle, equal to the included angle subscribed by the centerlines passing through two adjacent apertures 58, 58 in the nut 50 so that the arcuate spacing between the apertures 64, 66 in the key 60 are identical to the arcuate spacing between adjacent apertures 58, 58 in the nut 50. A tang 70 is formed integrally with the body 62 of the key 60 and projects radially inward from the inner surface of the body 62 and lies in the plane common with the plane of the body 62 of the key 60. The tang 70 has a radial centerline 72 which is offset from the radial centerline 74 of the key 60, which radial centerline 74 of the key 60 is midway between the spaced apertures 64, 66 therein.

Where the spanner nut 50 has five apertures 58 therein, and the end portion 38 of the shaft 12 has four radial slots 40, 42, 44, 46 formed therein, it becomes evident that very seldom will two adjacent apertures 58 in the nut 50 be equally spaced from one of the slots 40, 42, 44, 46 in the shaft 12. Therefore, to have the tang 70 on the key 60, centered thereon, would mean that there would be only one condition where a slot would be aligned with the tang 70 on the key 60 and, even then, it might require that the nut 50 be turned as much as 9° in order to align the tang 70 with the slot in the shaft 12. It has been discovered that by offsetting the tang 70 with respect to the center of the key 60, a larger number of possibilities of alignment with a reduced number of degrees of adjustment is possible.

Using the example illustrated in the drawings, which it is understood is for illustration purposes only and not by way of limitation, it has been discovered that by offsetting the centerline 72 of the tang 70 4½° with respect to the centerline 74 of the key 60, and making the key 60, in every other way symmetrical, it is possible to have forty different positions of the key 60 between the nut 50 and the shaft 12 thereby necessitating, at the very most, an adjustment of the nut 50 relative to the shaft 12 of not more than 4½°. This is accomplished by a trial and error method. That is, the nut 50 is cranked on the shaft 12 to the desired position and degree of tightness. The key 60 is then positioned on the nut 50 with two of the apertures 58 in the nut 50 aligning with the two apertures 64, 66 in the key 60 to see if the tang 70 aligns with one of the slots 40, 42, 44, 46 in the shaft 12. The key 60 can be turned over and again tried which will, in effect, shift the position of the tang 70 9° with respect to the openings in the key 60. The key 60 is selectively tried between each pair of adjacent apertures 58 in the nut 50 until the tang 70 aligns with, or is most nearly aligned with, one of the slots 40, 42, 44, 46 in the shaft 12. If the tang 70 does not exactly align with the slot in the shaft 12, the nut 50 can be turned a small increment, one way or the other, until the tang 70 fits into the slot whereupon two bolts 76 are threaded through the apertures 64, 66 in the key 60 and into the apertures 58 in the nut 50 to lock the key 60 on the nut 50. With the key 60 locked on the nut 50 and the tang 70 in one of the slots 40, 42, 44 or 46 in the shaft 12, it becomes apparent that the nut 50 cannot move relative to the shaft 12.

In the example illustrated, the apertures 64, 66 in the key 60 are spaced apart 72° with the centerline 72 of the tang 70 4½° offcenter from the centerline 74 of the key 60. Each of the five apertures 58 in the nut 50 are spaced apart from an adjacent aperture 58 by 72°. At the same time, the slots 40, 42, 44, 46 in the shaft 12 are spaced apart 90° so that with the nut 50 in position on the shaft end, two of the slots will be fairly closely aligned with two of the apertures 58 in the nut 50 and two of the slots in the shaft 12 will be generally located between two pairs of two adjacent apertures 58 in the nut 50. Since the key 60 can be affixed face up or face down, the tang 70 can be moved approximately 9° or 4½° on either side of the centerline of the key 60 between two adjacent apertures 58 in the nut 50 so that at no point will it be necessary to move the nut 50 relative to the shaft 12 more than a few degrees. The various combinations of positions of the key 60 with respect to the various openings in the nut 50 makes it possible to have forty positions of the key 60, whereby the tang 70 will line up with one of the slots in the shaft 12.

With my invention, it is not necessary to have a third member close to the periphery of the nut 50 and shaft 12 upon which a cap or lock plate is fastened. It is only necessary to slot the shaft 12 and to have a key 60 that is proportioned according to the number of openings in the nut 50 relative to the number of openings in the shaft 12, and offsetting the tang 70 on the key 60 an appropriate number of degrees to affect the maximum number of combinations for positioning the key 60 for locking the nut 50 to the shaft 12.

The embodiments of the invention in which an exclusive property or privilege is claimed are defined as follows:

1. A locking arrangement for securing a nut in position on the end of a shaft, said nut being threaded onto the end portion of said shaft, said shaft having a plurality of circumferentially equally spaced apart slots cut radially inward from the outer surface of said shaft, a plurality of equally spaced apart apertures symmetrically arranged in the axially facing end of said nut, a single key having a pair of apertures spaced apart a distance equal to the spacing between two spaced apart apertures in said nut, a tang projecting radially inward from said key, the centerline of said tang being offset from the centerline of said key, whereby by trial and error the apertures in the key are aligned with successive pairs of apertures in said nut until the tang aligns with and seats in one of said slots in said shaft, and means for securing said key to said nut with said tang in one of said slots said means permitting said key to be inverted to provide twice as many possible aligning positions of said tang with said slots.

2. A locking arrangement as claimed in claim 1 wherein said nut has five apertures therein.

3. A locking arrangement as claimed in claim 2 wherein said shaft has four slots formed therein.

4. A locking arrangement as claimed in claim 3 wherein said key has the centerline of said tang offset 4½° from the centerline of said key.

5. A locking arrangement as claimed in claim 4 wherein said means for securing said key to said nut is a pair of bolts passing through said key and threaded into said nut.

6. In a locking arrangement for securing a nut in position on the end of a shaft, said nut being threaded onto the end portion of said shaft, in combination, said shaft having a plurality of circumferentially spaced slots cut radially into said shaft, a plurality of equally spaced apart apertures symmetrically arranged in the axially facing end of said nut, a single key having a pair of apertures spaced apart a distance equal to the spacing between two adjacent spaced apart apertures in said nut, a tang projecting radially inward from said key, the apertures in the key being aligned with one pair of apertures in said nut with the tang aligned with and seated in one of said slots in said shaft, the centerline of said tang being offset from the centerline of said key, and means for securing said key to said nut with said tang in one of said slots said means permitting said key to be inverted to provide twice as many possible aligning positions of said tang with said slots.

7. In a locking arrangement as claimed in claim 6 wherein said slots in said shaft are equally spaced apart.

8. In a locking arrangement as claimed in claim 7 wherein there are more apertures in said nut than there are slots in said shaft.

9. A locking arrangement for securing a nut in position on the end of a shaft, said nut being threaded onto the end portion of said shaft, said shaft having a plurality of circumferentially equally spaced apart slots cut radially and axially into said end portion of said shaft, a plurality of equally spaced apart apertures symmetrically arranged in the axially facing end of said nut with the number of said apertures exceeding the number of said slots, a single key having a pair of apertures spaced apart a distance equal to the spaced apart apertures in said nut, a tang projecting radially inward from said key, the centerline of said tang being offset from the centerline midway between said apertures in said key, whereby the apertures in the key are aligned with successive pairs of apertures in said nut until the tang aligns with and seats in one of said slots in said shaft, and means for securing said key to said nut with said tang in one of said slots, said means permitting said key to be inverted to provide twice as many possible aligning positions of said tang with said slots.

* * * * *

UNITED STATES PATENT AND TRADEMARK OFFICE
CERTIFICATE OF CORRECTION

PATENT NO.    : 4,090,545
DATED         : May 23, 1978
INVENTOR(S)   : Arthur J. Ritter, Jr.

It is certified that error appears in the above-identified patent and that said Letters Patent are hereby corrected as shown below:

Column 4, line 13, after "slots" insert a comma --,--.

Column 4, line 42, after "slots" insert a comma --,--.

*Signed and Sealed this*

*Thirty-first* Day of *October 1978*

[SEAL]

*Attest:*

RUTH C. MASON
*Attesting Officer*

DONALD W. BANNER
*Commissioner of Patents and Trademarks*